(12) United States Patent
Nakayama et al.

(10) Patent No.: US 12,523,755 B2
(45) Date of Patent: Jan. 13, 2026

(54) SENSOR AND CONTROL METHOD

(71) Applicant: Panasonic Intellectual Property Management Co., Ltd., Osaka (JP)

(72) Inventors: Takeshi Nakayama, Hyogo (JP); Shoichi Iizuka, Osaka (JP); Naoki Honma, Iwate (JP); Tomonori Ito, Iwate (JP); Teppei Hayashi, Iwate (JP); Nobuyuki Shiraki, Osaka (JP); Kentaro Murata, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 440 days.

(21) Appl. No.: 18/267,390

(22) PCT Filed: Dec. 14, 2021

(86) PCT No.: PCT/JP2021/045971
§ 371 (c)(1),
(2) Date: Jun. 14, 2023

(87) PCT Pub. No.: WO2022/138312
PCT Pub. Date: Jun. 30, 2022

(65) Prior Publication Data
US 2024/0118406 A1    Apr. 11, 2024

(30) Foreign Application Priority Data
Dec. 25, 2020    (JP) .................................. 2020-217596

(51) Int. Cl.
*G01S 13/46*    (2006.01)
*G01S 7/40*     (2006.01)
*G01S 7/41*     (2006.01)

(52) U.S. Cl.
CPC ................ *G01S 13/46* (2013.01); *G01S 7/40* (2013.01); *G01S 7/415* (2013.01)

(58) Field of Classification Search
CPC ............. G01S 13/46; G01S 7/40; G01S 7/415
See application file for complete search history.

(56) References Cited

U.S. PATENT DOCUMENTS

2013/0335257 A1    12/2013  Abrahamson
2016/0025847 A1    1/2016   Okuya et al.
(Continued)

FOREIGN PATENT DOCUMENTS

JP    2014-512526    5/2014
JP    2015-117972    6/2015
(Continued)

OTHER PUBLICATIONS

International Search Report (ISR) from International Searching Authority (Japan Patent Office) in International Pat. Appl. No. PCT/JP2021/045971, dated Feb. 22, 2022, together with an English language translation.
(Continued)

*Primary Examiner* — Vladimir Magloire
*Assistant Examiner* — Nazra Nur Waheed
(74) *Attorney, Agent, or Firm* — Greenblum & Bernstein, P.L.C.

(57) ABSTRACT

A sensor includes a complex-transfer-function calculator that calculates a complex transfer function from received signals, a reflection-coefficient calculator that calculates a reflection coefficient using a complex transfer function when an object to be detected is arranged at one of L positions and an ideal complex transfer function which is a theoretical value for the position at which the object to be detected is arranged, various normalizers that calculate a normalized reflection coefficient by normalizing the reflection coeffi- (Continued)

cient, a reflection-coefficient interpolator that calculates an interpolated reflection coefficient by interpolation calculation of the reflection coefficient using the normalized reflection coefficient for each coordinates used in position estimation of the object to be detected, and a position estimator that corrects the position estimation, using a steering vector and the interpolated reflection coefficient that are determined based on the position of each of the transmitting antenna elements and the receiving antenna elements.

6 Claims, 10 Drawing Sheets

(56) References Cited

U.S. PATENT DOCUMENTS

2016/0377714 A1* 12/2016 Masuda ............... G01S 13/56
342/28

2018/0011169 A1* 1/2018 Nakayama ............... G01S 13/66
2018/0302102 A1* 10/2018 Oshima ............... H03H 21/0012

FOREIGN PATENT DOCUMENTS

| JP | 6256681 | 1/2018 |
| WO | 2012/125100 | 9/2012 |
| WO | 2014/141519 | 9/2014 |

OTHER PUBLICATIONS

Ito et al., "Calibration Method of Living-Body MIMO Radar Using Known Target Locations", Proceedings of The 2021 IEICE General Conference, ISSN: 1349-1369, Feb. 2021, pp. 139, along with a partial English language translation thereof.

* cited by examiner

SENSOR AND CONTROL METHOD

TECHNICAL FIELD

The present disclosure relates to a sensor, a control method, and a system that estimate the position of a living body by using radio signals.

BACKGROUND ART

Methods using radio signals are under consideration as methods of knowing, for example, the position of a living body (see, for example, Patent Literatures (PTL) 1 to 3). PTL 1 discloses a living-body detection method using a Doppler sensor, and PTL 2 discloses a method of sensing human motions or biological information by using a Doppler sensor and a filter. PTL 3 discloses the ability to know the position or state of a person to be detected, by using Fourier transform to analyze components including Doppler shift. PTL 4 discloses a method of calibrating array antennas in order to estimate the position of a person by using radio signals.

CITATION LIST

Patent Literature

[PTL 1]
  Japanese Unexamined Patent Application Publication (Translation of PCT Application) No. 2014-512526
[PTL 2]
  International Publication No. 2014/141519
[PTL 3]
  Japanese Unexamined Patent Application Publication No. 2015-117972
[PTL 4]
  Japanese Patent No. 6256681

SUMMARY OF INVENTION

Technical Problem

The method disclosed in PTL 4, however, has a problem that it is difficult to sufficiently calibrate directional antennas. Although ideal non-directional antennas have no angular characteristics included in radiation characteristics, ordinary antennas with physical lengths have angular characteristics and, if a calibrated value is acquired at one point, there is a limit to the angular range in which effective use of the calibrated value is possible.

The present disclosure has been made in light of the circumstances described above, and it is an object of the present disclosure to provide a sensor capable of calibrating devices by a simple method in a short time and with high accuracy in an apparatus for estimating the position of a living body by using radio signals.

Solution to Problem

A sensor according to one aspect of the present disclosure includes a transmitting antenna unit that includes N transmitting antenna elements that transmit a signal to a predetermined space, where N is a natural number greater than or equal to 2, a receiving antenna unit that receives signals transmitted from the transmitting antenna unit for a predetermined period and that includes M receiving antenna elements that receive the signal received, where M is a natural number greater than or equal to 2, a complex-transfer-function calculator that calculates a complex transfer function from the signal received, a reflection-coefficient calculator that calculates a complex transfer function when an object to be detected is arranged at one of L positions, where L is a natural number greater than or equal to 2, for each of the L positions, calculates an ideal complex transfer function for each of the L positions, the ideal complex transfer function being a theoretical value for the position at which the object to be detected is arranged, and calculates a reflection coefficient using the complex transfer functions and the ideal complex transfer functions, a normalized-reflection-coefficient calculator that calculates a normalized reflection coefficient by normalizing the reflection coefficient by a predetermined method, an interpolated-reflection-coefficient calculator that calculates an interpolated reflection coefficient by interpolation calculation of the reflection coefficient using the normalized reflection coefficient for each coordinate used in position estimation of the object to be detected by a predetermined method, and a position estimator that corrects the position estimation by a predetermined method, using a steering vector and the interpolated reflection coefficient that are determined based on a position of each of the transmitting antenna elements and the receiving antenna elements.

It is to be noted that such a generic or specific embodiment of the present disclosure may be realized as a system, an apparatus, an integrated circuit, a computer program, or a computer-readable recording medium such as a CD-ROM, or may be realized as an arbitrary combination of a system, an apparatus, an integrated circuit, a computer program, and a recording medium.

Advantageous Effects of Invention

According to the present disclosure, it is possible to calibrate devices by a simple method in a short time and with high accuracy in an apparatus for estimating the position of a living body by using radio signals.

DESCRIPTION OF EMBODIMENTS

Figure 1:
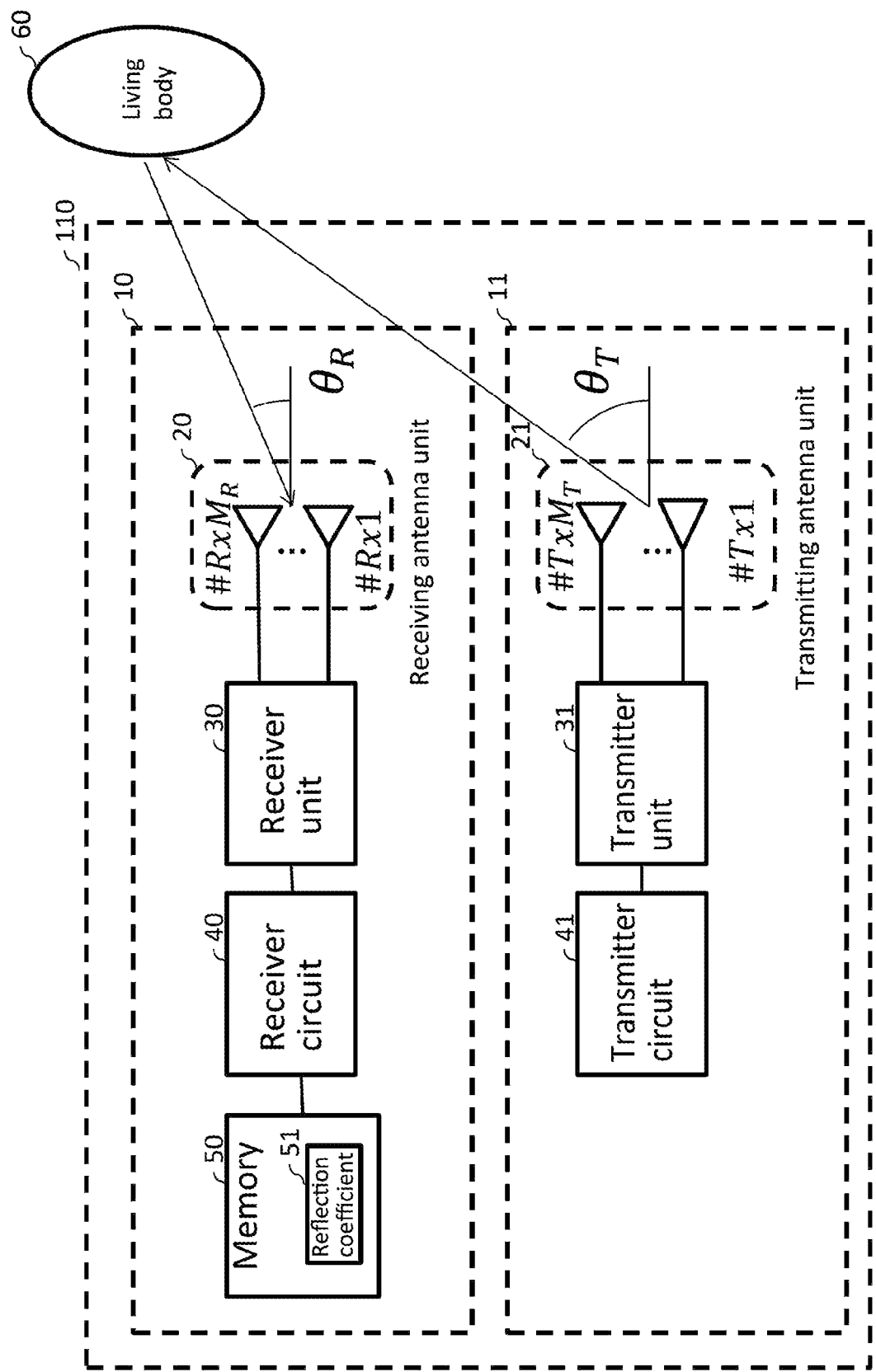
FIG. 1 is a schematic diagram showing one example of a configuration of a sensor according to an embodiment.

Underlying Knowledge Forming Basis of the Present Disclosure

Methods using radio signals are under consideration as methods of knowing, for example, the position of a person.

For example, PTL 1 discloses a living-body detection method using a Doppler sensor, and PTL 2 discloses a method of sensing human motions or biological information by using a Doppler sensor and a filter.

PTL 3 discloses, for example, a method of transmitting radio signals to a predetermined region and receiving the radio signals reflected from an object to be detected by a plurality of antennas so as to estimate complex transfer functions between transmitting and receiving antennas.

PTL 4 discloses a method of calibrating array antennas in order to estimate the position of a person by using radio signals. More specifically, the method involves arranging an object to be detected at a known position, measuring a matrix of complex transfer functions between a transmitter and a receiver, calculating a correlation matrix on the basis of frequency responses of the complex transfer functions, and calculating a calibrated value of a steering vector by using the fact that the position of the object to be detected is known. Based on this, PTL 4 discloses a method of calibrating array antennas in order to estimate the position of a person by using radio signals.

The aforementioned method disclosed in PTL 4, however, cannot handle the calibration of antennas characterized by directivity. This is because, although a calibrated value acquired at one point can be expanded to all measuring positions in the case of using non-directional antennas, antennas characterized by directivity cause variations in radiation phase or radiation signal strength depending on position.

In general, dipole antennas are assumed to have uniform radiation characteristics in the same plane, and patch antennas are assumed to have uniform radiation characteristics in the forward direction. That is, the characteristics of the dipole antennas in the same plane or the forward characteristics of the patch antennas are uniform among antenna elements (e.g., receiving antenna elements 121 to 123 illustrated in FIG. 2), irrespective of angle θ.

However, there are no omnidirectional antennas that have uniform spherical radiation characteristics. Moreover, in some cases inverted-F antennas may be used because consumer products such as Wi-Fi (registered trademark) wireless devices have optimized omnidirectional radiation characteristics.

In this way, in the case of using antennas with irregular directivity, antenna elements have antenna characteristics (e.g., antenna characteristics 221 to 223 illustrated in the drawing) that vary depending on angle θ. Therefore, calibrated values need to be calibrated in view of antennas' directivity in order to enable every-angle estimation of the position of a living body. Otherwise, the accuracy of estimating the direction or position of a person will decrease.

As described above, conventional technology has a problem of not being able to calculate calibrated values that can be used for every angle to estimate the position of a living body by using radio signals.

In view of this, the inventors of the present disclosure have arrived at the idea of sensors and the like that can be used for every angle to calculate calibrated values used to estimate the position of a living body by using radio signals.

A sensor according to one aspect of the present disclosure includes a transmitting antenna unit that includes N transmitting antenna elements that transmit a signal to a predetermined space, where N is a natural number greater than or equal to 2, a receiving antenna unit that receives signals transmitted from the transmitting antenna unit for a predetermined period and that includes M receiving antenna elements that receive the signal received, where M is a natural number greater than or equal to 2, a complex-transfer-function calculator that calculates a complex transfer function from the signal received, a reflection-coefficient calculator that calculates a complex transfer function when an object to be detected is arranged at one of L positions, where L is a natural number greater than or equal to 2, for each of the L positions, calculates an ideal complex transfer function for each of the L positions, the ideal complex transfer function being a theoretical value for the position at which the object to be detected is arranged, and calculates a reflection coefficient using the complex transfer functions and the ideal complex transfer functions, a normalized-reflection-coefficient calculator that calculates a normalized reflection coefficient by normalizing the reflection coefficient by a predetermined method, an interpolated-reflection-coefficient calculator that calculates an interpolated reflection coefficient by interpolation calculation of the reflection coefficient using the normalized reflection coefficient for each coordinate used in position estimation of the object to be detected by a predetermined method, and a position estimator that corrects the position estimation by a predetermined method, using a steering vector and the interpolated reflection coefficient that are determined based on a position of each of the transmitting antenna elements and the receiving antenna elements.

According to the above-described aspect, even if provided with directional antennas, the sensor is capable of estimating the position of a living body by accurately correcting the estimated position. This technique makes it possible to apply a technique for estimating the position of a living body, even to communication equipment that uses antennas with a wider radiation range, i.e., a wider communication ranges, (e.g., inverted-F antennas or sheet-metal antennas) than antennas that have limited radiation directions but have simple shapes or characteristics (e.g., dipole antennas, monopole antennas, or patch antennas). This increases the accuracy of position estimation by the sensor provided with antennas with a wide radiation range. Accordingly, in the apparatus for estimating the position of a living body by using radio signals, the sensor is capable of calibrating devices by a simple method in a short time and with high accuracy.

A sensor according to another aspect of the present disclosure includes a transmitting antenna unit that includes N transmitting antenna elements that transmit a signal to a predetermined space, where N is a natural number greater than or equal to 2, a receiving antenna unit that receives signals transmitted from the transmitting antenna unit for a predetermined period and that includes M receiving antenna elements that receive the signal received, where M is a natural number greater than or equal to 2, a complex-transfer-function calculator that calculates a complex transfer function from the signal received, a reflection-coefficient calculator that calculates a complex transfer function when an object to be detected is arranged at one of L positions, where L is a natural number greater than or equal to 2, for each of the L positions, calculates an ideal complex transfer function for each of the L positions, the ideal complex transfer function being a theoretical value for the position at which the object to be detected is arranged, and calculates a reflection coefficient using the complex transfer functions and the ideal complex transfer functions, a normalized-reflection-coefficient calculator that calculates a normalized reflection coefficient by normalizing the reflection coefficient by a predetermined method, and a memory that stores the normalized reflection coefficient.

According to the above-described aspect, even if provided with directional antennas, the sensor is capable of estimating the position of a living body by accurately correcting the estimated position. This technique makes it possible to apply a technique for estimating the position of a living body, even to communication equipment that uses antennas with a wider radiation range, i.e., a wider communication ranges, (e.g., inverted-F antennas or sheet-metal antennas) than antennas that have limited radiation directions but have simple shapes or characteristics (e.g., dipole antennas, monopole antennas, or patch antennas). This increases the accuracy of position estimation by the sensor provided with antennas with a wide radiation range. Accordingly, in the apparatus for estimating the position of a living body by using radio signals, the sensor is capable of calibrating devices by a simple method in a short time and with high accuracy.

For example, the sensor described above may further include an interpolated-reflection-coefficient calculator that reads out the normalized reflection coefficient from the memory and calculates an interpolated reflection coefficient by interpolation calculation of the reflection coefficient using the normalized reflection coefficient for each coordinate used in position estimation of the object to be detected by a predetermined method, and a position estimator that corrects the position estimation by the predetermined method, using a steering vector and the interpolated reflection coefficient that are determined based on a position of each of the transmitting antenna elements and the receiving antenna elements.

According to the above-described aspect, even if provided with directional antennas, the sensor is capable of estimating the position of a living body by accurately correcting the estimated position. This technique makes it possible to apply a technique for estimating the position of a living body, even to communication equipment that uses antennas with a wider radiation range, i.e., a wider communication ranges, (e.g., inverted-F antennas or sheet-metal antennas) than antennas that have limited radiation directions but have simple shapes or characteristics (e.g., dipole antennas, monopole antennas, or patch antennas). This increases the accuracy of position estimation by the sensor provided with antennas with a wide radiation range. Accordingly, in the apparatus for estimating the position of a living body by using radio signals, the sensor is capable of calibrating devices by a simple method in a short time and with high accuracy.

For example, the position estimator may include a corrected-steering-vector calculator that calculates a corrected steering vector by correcting the steering vector using the steering vector and the interpolated reflection coefficient, and the position estimator may correct the position estimation, using the corrected steering vector corrected by the corrected-steering-vector calculator.

According to the above-described aspect, the sensor corrects the estimated position by using the corrected steering vector obtained by the correction using the steering vector and the interpolated reflection coefficient. Accordingly, it is possible to more easily configure devices in a short time and with high accuracy.

For example, the normalized-reflection-coefficient calculator may normalize a phase in a frequency direction, using a signal received from a predetermined antenna element among the M receiving antenna elements.

According to the above-described aspect, the sensor performs position estimation using the received signal whose phase is normalized in the frequency direction. Accordingly, in the apparatus for estimating the position of a living body by using radio signals, the sensor is capable of calibrating devices by a simple method in a short time and with high accuracy.

For example, the normalized-reflection-coefficient calculator may further normalize the phase for each measuring position.

According to the above-described aspect, the sensor performs position estimation using the received signal whose phase is normalized for each measuring position. Accordingly, in the apparatus for estimating the position of a living body by using radio signals, the sensor is capable of calibrating devices by a simple method in a short time and with high accuracy.

A control method according to one aspect of the present disclosure is a control method for controlling a sensor that includes a transmitting antenna unit and a receiving antenna unit. The transmitting antenna unit includes N transmitting antenna elements that transmit a signal to a predetermined space, where N is a natural number greater than or equal to 2, and the receiving antenna unit receives signals transmitted from the transmitting antenna unit for a predetermined period and includes M receiving antenna elements that receive the signal received, where M is a natural number greater than or equal to 2. The control method includes calculating a complex transfer function from the signal received, calculating a complex transfer function when an object to be detected is arranged at one of L positions, where L is a natural number greater than or equal to 2, for each of the L positions, calculating an ideal complex transfer function for each of the L positions, the ideal complex transfer function being a theoretical value for the position at which the object to be detected is arranged, and calculating a reflection coefficient using the complex transfer functions and the ideal complex transfer functions, calculating a normalized reflection coefficient by normalizing the reflection coefficient by a predetermined method, calculating an interpolated reflection coefficient by interpolation calculation of the reflection coefficient using the normalized reflection coefficient for each coordinate used in position estimation of the object to be detected by a predetermined method, and correcting the position estimation by a predetermined method, using a steering vector and the interpolated reflection coefficient that are determined based on a position of each of the transmitting antenna elements and the receiving antenna elements.

According to the above-described aspect, it is possible to achieve effects similar to those of the sensor described above.

A system according to one aspect of the present disclosure includes the sensor according to any one of claims 1 and 3 to 6, and a server. The sensor transmits a result of the position estimation to the server, and the server receives a result of the position estimation transmitted from the sensor.

According to the above-described aspect, it is possible to achieve effects similar to those of the sensor described above.

Note that the present disclosure may be implemented not only as a device, but also as an integrated circuit including processing means included in the above device, as a method including processing means that configure the above device as steps, as a program for causing a computer to execute the above steps, or as information, data, or signals that indicate the above program. The above program, information, data, and signals may be distributed via a recording medium such as a CD-ROM or via a communication medium such as the Internet.

The sensor according to the present disclosure includes a device for estimating the position of a living body and may also be referred to as a position estimation device.

Hereinafter, an embodiment of the present disclosure will be described in detail with reference to the drawings. It is to be noted that the embodiment described below is one specific example of the present disclosure. Numerical values, shapes, materials, constituent elements, the positions of arrangement of constituent elements and the form of connection of constituent elements, steps, a sequence of steps, and so on given in the following embodiment are mere examples and do not intend to limit the scope of the present disclosure. Among the constituent elements described in the following embodiment, those that are not recited in any of the independent claims, which define the most generic concept of the present disclosure, are described as arbitrary constituent elements. In the specification and the drawings, constituent elements that have substantially the same functional configuration may be given the same reference signs, and redundant description thereof may be omitted.

Embodiment

Hereinafter, a calibration method for estimating the positions of living bodies 60 that are objects to be detected (or objects to be estimated) by sensor 110 according to the embodiment will be described with reference to the drawings.

Configuration of Sensor 110

Figure 2:
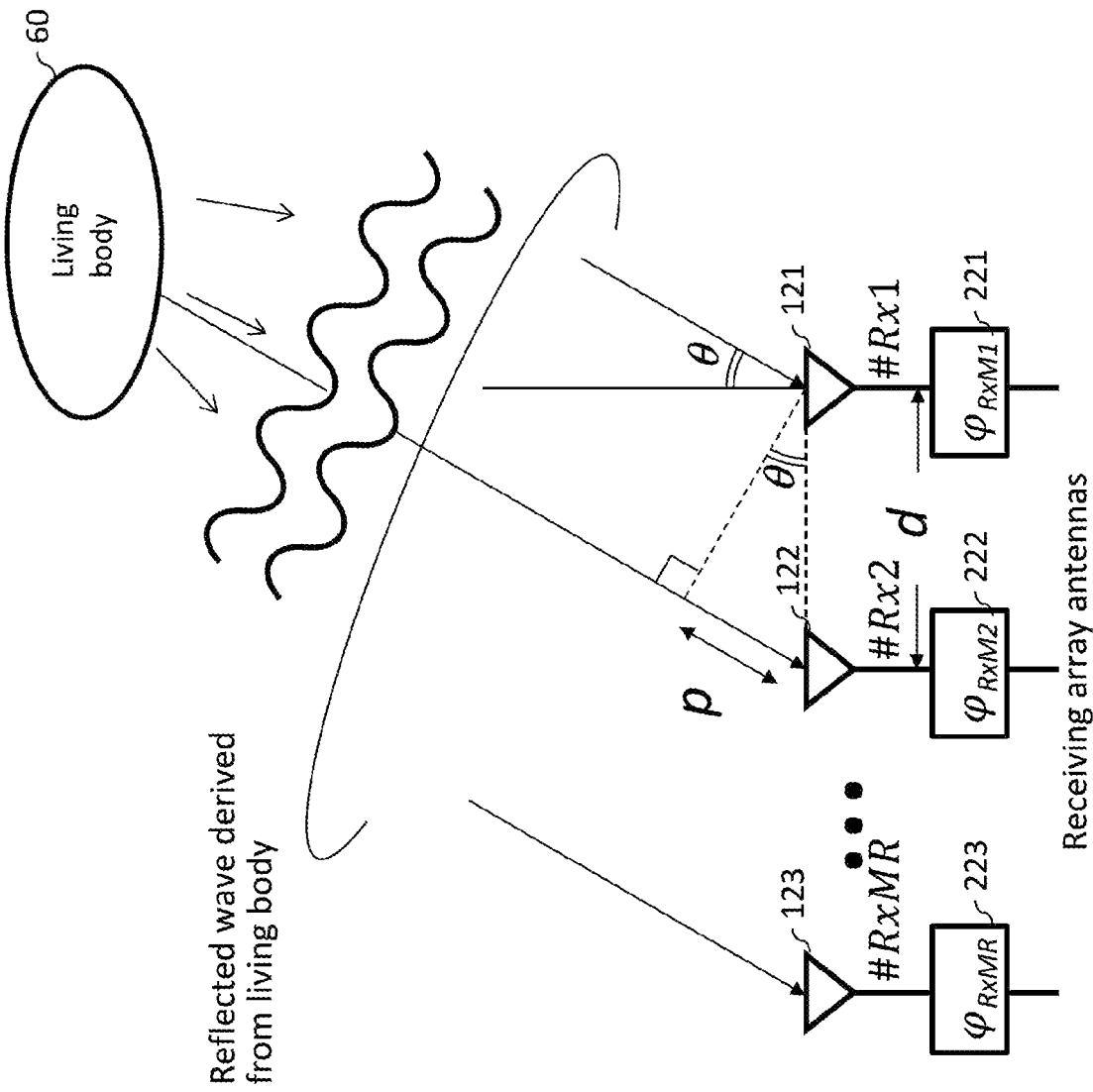
FIG. 2 is a descriptive diagram for describing a steering vector and a phase error of a receiver illustrated in FIG. 1.
Figure 3:
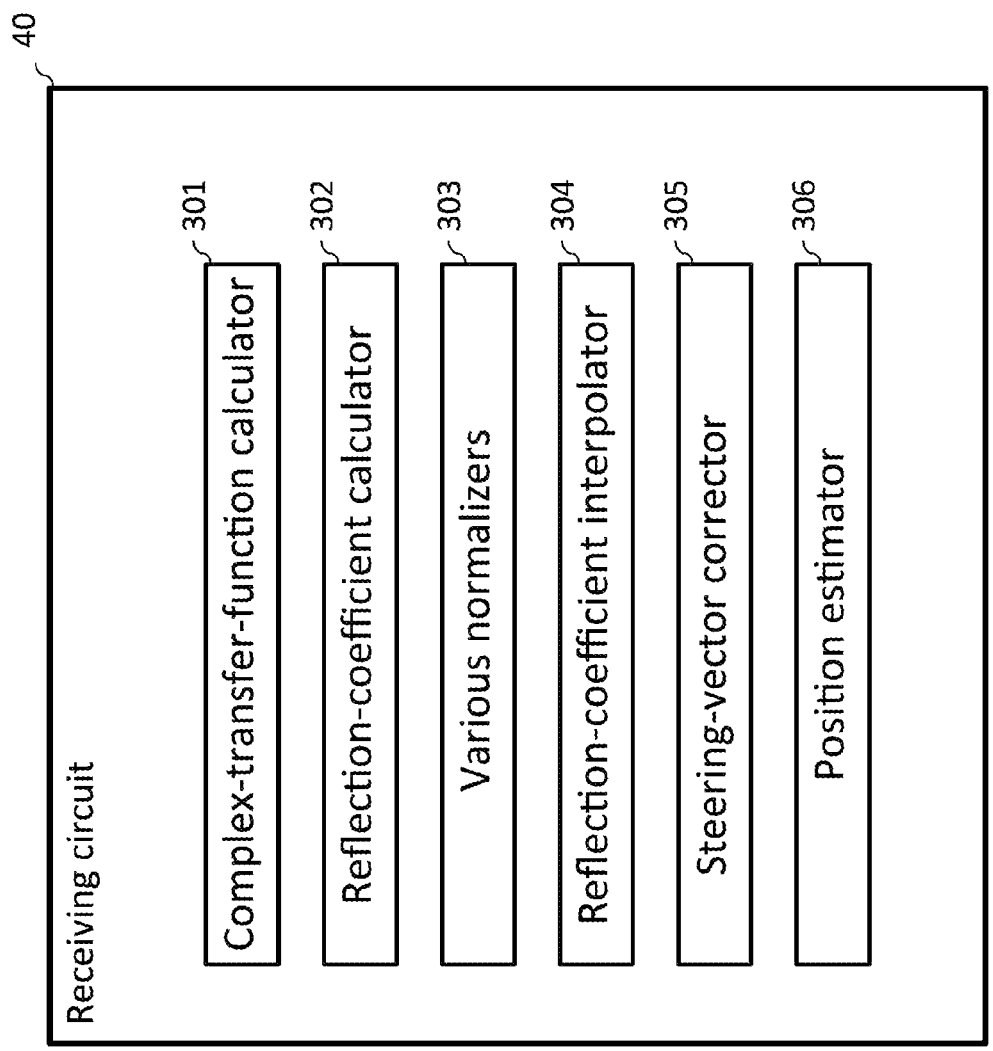
FIG. 3 is a schematic diagram showing one example of a detailed configuration of a receiver circuit illustrated in FIG. 1.
Figure 4:
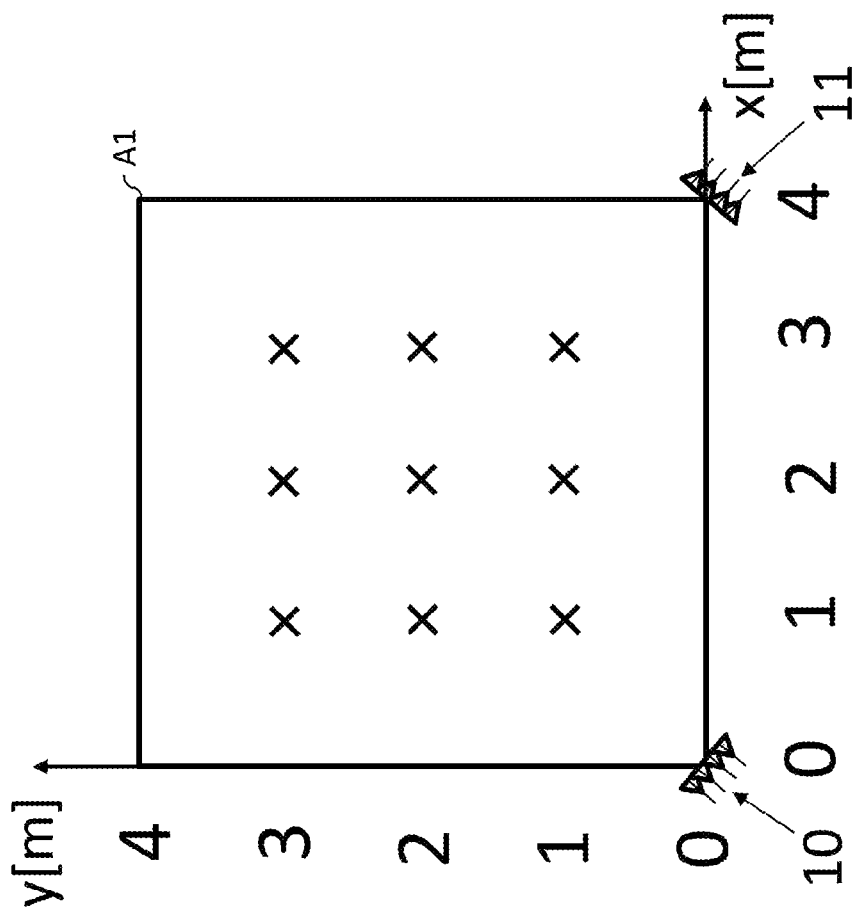
FIG. 4 is a descriptive diagram for describing the arrangement of an experimental apparatus.
Figure 5:
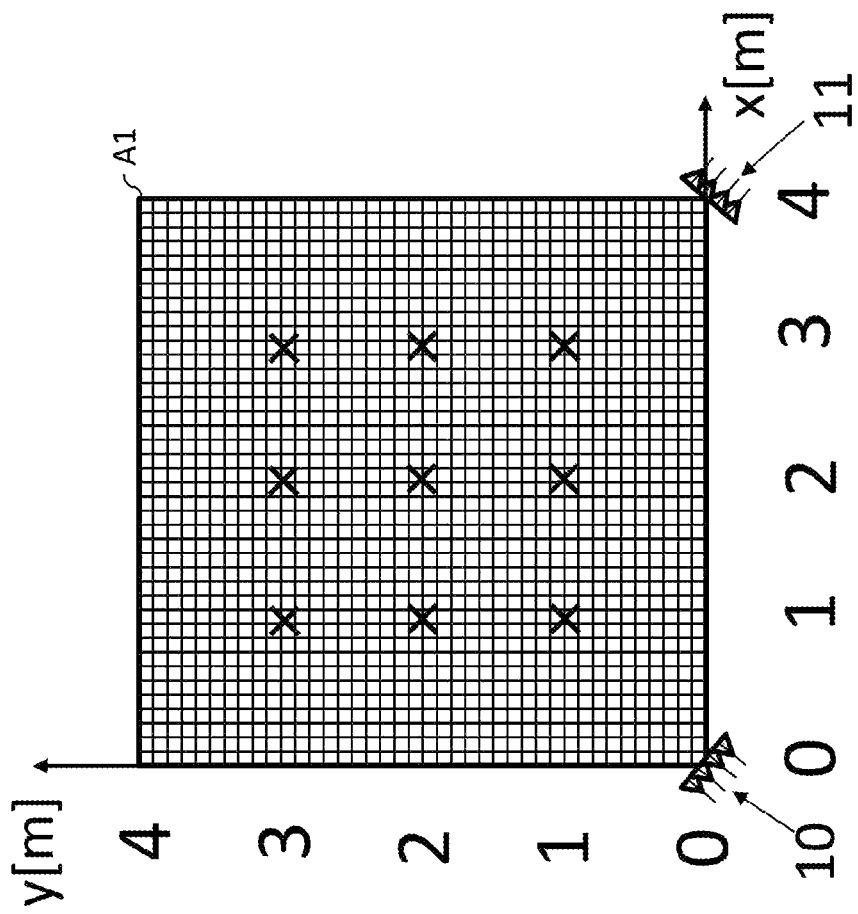
FIG. 5 is a diagram illustrating the concept of coordinates used to perform position estimation by experiment using an estimation method according to the embodiment.

FIG. 1 is a schematic diagram showing one example of a configuration of sensor 110 according to the present embodiment. FIG. 2 is a descriptive diagram for describing a steering vector and a phase error of receiver 10 illustrated in FIG. 1. FIG. 3 is a schematic diagram showing one example of a detailed configuration of receiver circuit 40 illustrated in FIG. 1. FIG. 4 is a descriptive diagram for describing the arrangement of an experimental apparatus. FIG. 5 is a diagram illustrating the concept of coordinates used to perform position estimation by experiment using an estimation method according to the present embodiment.

The configuration of sensor 110 according to the present disclosure includes receiver 10 and transmitter 11.

Receiver 10 includes receiving antenna unit 20, receiver unit 30, receiver circuit 40, and memory 50, the receiving antenna unit including $M_R$ receiving antenna elements ($M_R$ is a natural number greater than or equal to 2).

Transmitter 11 includes transmitting antenna unit 21, transmitter unit 31, and transmitter circuit 41, the transmitting antenna unit including $M_T$ transmitting antenna elements ($M_T$ is a natural number greater than or equal to 1).

FIG. 4 is an illustration of the arrangement of an experimental apparatus according to the present embodiment. For example, receiver 10 and transmitter 11 may be arranged four meters away from each other and have predetermined region A1 as a measurement range.

The $M_T$ transmitting antenna elements transmit transmission signals to predetermined region A1 that includes living bodies 60. The transmission signals are high-frequency signals such as microwaves generated by transmitter 11 or any other device.

Living bodies 60 may, for example, be persons. Living bodies 60 are objects to be estimated by sensor 110 and refer to living bodies that are subjected to position estimation. Predetermined region A1 refers to a predetermined range of space and includes living bodies 60. In other words, predetermined region A1 refers to a space used to estimate the positions of living bodies 60 by sensor 110.

For example, in the present embodiment, receiver unit 30 receives first received signals, and receiver circuit 40 calculates reflection coefficients in a state in which living bodies are arranged at positions indicated by crosses in FIG. 4. Thereafter, in a fine grid formed by the points of intersection of additional lines illustrated in FIG. 5, interpolated values for the reflection coefficients are calculated and the steering vector is corrected so as to improve the accuracy of estimating the positions of living bodies 60.

Transmitting antenna unit 21 includes the $M_T$ transmitting antenna elements and transmits, for example, first transmission signals to predetermined region A1 including living bodies 60 to be measured.

Receiving antenna unit 20 includes the $M_R$ receiving antenna elements and is arranged at one corner of predetermined region A1. Receiving antenna unit 20 uses the $M_R$ receiving antenna elements to receive first received signals for a predetermined period, the first received signals including reflection signals obtained by reflection of the transmission signals from living bodies 60.

Transmitter 11

In the present embodiment, receiver 10 and transmitter 11 are each arranged at one corner of predetermined region A1. Transmitter 11 transmits transmission signals to predetermined region A1 including living bodies 60 such as persons. Receiver 10 receives received signals that include reflection signals obtained by reflection of the transmission signals from living bodies 60. For example, two sets each including one receiver 10 and one transmitter 11 may be used such that the two receivers 10 and the two transmitters 11 are arranged at the four corners of predetermined region A1.

As illustrated in FIG. 1, transmitter unit 31 uses the $M_T$ antenna elements to transmit the transmission signals to predetermined region A1. More specifically, transmitter unit 31 uses the $M_T$ antenna elements to eject microwaves as the transmission signals to living bodies 60 such as persons. Note that transmitter unit 31 using the $M_T$ antenna elements may transmit non-modulated transmission signals, or may transmit modulated transmission signals. In the case of transmitting modulated transmission signals, transmitter circuit 41 may further include a circuit for performing modulation processing.

In the present embodiment, the frequency given as an example is 2.4 GHz, but any frequency may be used, such as a frequency of 5 GHz or a frequency in a millimeter waveband. Alternatively, the transmitting antenna elements may double as the receiving antenna elements, and vice versa. As another alternative, the transmitting antenna elements and the receiving antenna elements may be shared among hardware of wireless devices such as a Wi-Fi router or a Wi-Fi slave machine.

Receiver 10

Receiving antenna unit 2 uses the $M_R$ antenna elements to receive received signals for a predetermined period, the received signals including reflection signals obtained by reflection of the transmission signals from living bodies 60. Receiving unit 30 outputs the received signals to receiver circuit 40. Note that receiver unit 30 may include a circuit for processing the received signals. In this case, receiver unit 30 may convert the received signals into low-frequency signals by frequency conversion. Alternatively, receiver unit 30 may perform demodulation processing on the received signals. Then, receiver unit 30 outputs the signals obtained by the frequency conversion and/or the demodulation processing to receiver circuit 40.

Figure 7:
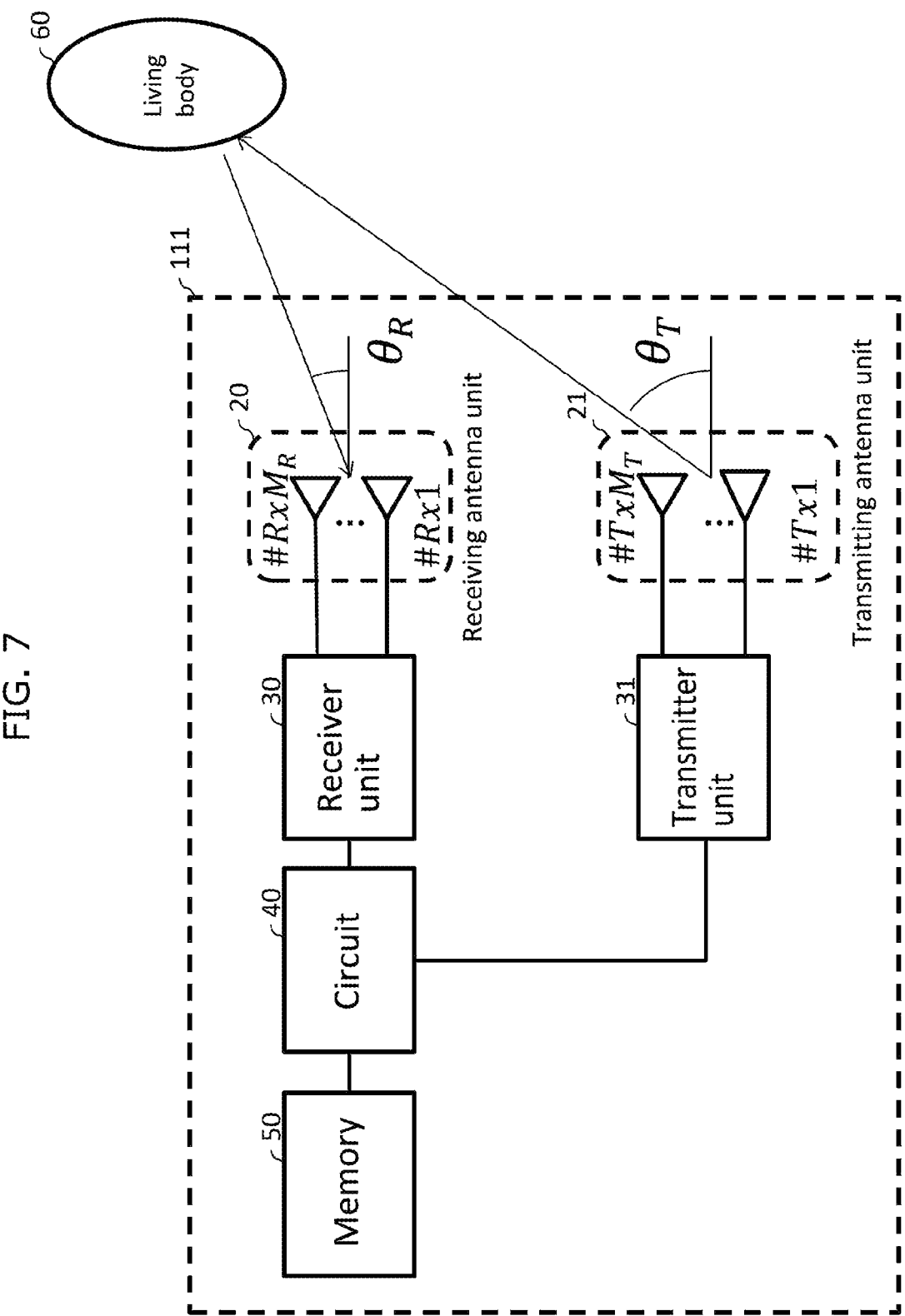
FIG. 7 is a schematic diagram showing an example of variations of the configuration of the sensor according to the embodiment.

In the example illustrated in FIG. 1, transmitter unit 31 and receiver unit 30 are respectively expressed as a unit for transmission and a unit for reception, but the present disclosure is not limited thereto. The number of antenna elements may be four or eight or more and, as illustrated in FIG. 7, one sensor 111 may have the function of both a transmitter and a receiver. As another alternative, one antenna unit may be used as both transmitting antenna unit 21 and receiving antenna unit 20.

Memory 50

Memory 50 is an auxiliary storage having a nonvolatile storage area and may, for example, be a read only memory (ROM), a flash memory, or a hard disk drive (HDD). For example, memory 50 may store information used in a variety of processing for actuating sensor 110.

In the present embodiment, the configuration of the experimental apparatus includes receiver 10 and transmitter 11 as illustrated in FIG. 1.

Receiver Circuit 40

Receiver circuit 40 executes a variety of processing for actuating sensor 110. For example, the configuration of receiver circuit 40 may include a processor that executes a control program (e.g., a central processing unit: CPU), and a volatile storage area (main storage) that is used as a work area during execution of the control program. The storage area may, for example, be a random access memory (RAM).

Receiver circuit 40 temporarily stores the first received signals acquired from receiver unit 30 in the storage area for a predetermined period. Receiver circuit 40 may also temporarily store the phases and amplitudes of the first received signals in the storage area for a predetermined period. In the present embodiment, receiver circuit 40 temporarily stores the received signals acquired from receiver unit 30 in the storage area for a predetermined period.

Note that receiver circuit 40 may be configured by a dedicated circuit for performing a variety of processing for actuating sensor 110. That is, receiver circuit 40 may be a circuit for performing software processing, or may be a circuit for performing hardware processing. Receiver circuit 40 may also have a nonvolatile storage area.

Next, a functional configuration of receiver circuit 40 will be described.

As illustrated in FIG. 3, receiver circuit 40 includes complex-transfer-function calculator 301, reflection-coefficient calculator 302, various normalizers 303, reflection-coefficient interpolator 304, steering-vector corrector 305, and position estimator 306. The following is a specific description of the configuration of receiver circuit 40.

Complex-Transfer-Function Calculator 301

Complex-transfer-function calculator 301 calculates complex transfer function H(t), using the first received signals stored in the storage area of receiver circuit 40. The first received signals may be signals obtained by extracting only a predetermined frequency component from the signals received by receiver unit 30. The predetermined frequency component may, for example, be a frequency component that includes frequencies of human respiration (e.g., frequencies of approximately 0.15 Hz to approximately 0.5 Hz).

Here, complex transfer function H(t) obtained in the case of arranging a multiple-input and multiple-output (MIMO) array configured by the $M_r$ receiving antenna elements of receiver 10 and the $M_t$ transmitting antenna elements of transmitter 11 around living bodies 60 is expressed by Expression 1 below.

[Math. 1]

$$H(t) = \begin{pmatrix} h_{11}(t) & \cdots & h_{1M_t}(t) \\ \vdots & \ddots & \vdots \\ h_{M_r1}(t) & \cdots & h_{M_rM_t}(t) \end{pmatrix} \quad \text{(Expression 1)}$$

In Expression 1, $M_r$ denotes the antenna element number of receiver 10, and $M_t$ denotes the antenna element number of transmitter 11.

$$h_{M_r,M_t} \quad \text{[Math. 2]}$$

denotes the complex channel response from the $M_t$-th antenna of transmitter 11 to the $M_r$-th antenna of receiver 10, and t denotes the observation time.

Next, complex-transfer-function calculator 301 calculates frequency response matrix HF(ω) using complex transfer function H(t). Frequency response matrix HF(ω) is given by Expression 2.

[Math. 3]

$$HF(\omega) = \begin{pmatrix} hf_{11}(\omega) & \cdots & hf_{1M_t}(\omega) \\ \vdots & \ddots & \vdots \\ hf_{M_r1}(\omega) & \cdots & hf_{M_rM_t}(\omega) \end{pmatrix} \quad \text{(Expression 2)}$$

Here, ω denotes the frequency range corresponding to the living bodies.

Reflection-Coefficient Calculator 302

Reflection-coefficient calculator 302 calculates a reflection coefficient. In the calculation of the reflection coefficient, reflection-coefficient calculator 302 calculates a complex transfer function for each of L positions (L is a natural number greater than or equal to 2) when an object to be detected is arranged at the position among the L positions, calculates an ideal complex transfer function for each of the L positions, the ideal complex transfer function being a theoretical value for the position at which the object to be detected is arranged, and calculates the reflection coefficient using the complex transfer function and the ideal complex transfer function.

Specifically, reflection-coefficient calculator 302 calculates ideal complex transfer function H'(t) and frequency response HF'(ω) of the ideal complex transfer function by simulation for the position at which each living body 60 is arranged.

At this time, ideal complex transfer function H'(t) and frequency response HF'(ω) of the ideal complex transfer function may be calculated by performing a radio simulation in which an ideal reflection plate such as an iron plate is placed at the position at which living body 60 is arranged. Alternatively, ideal complex transfer function H'(t) corresponding to the position of arrangement and frequency response HF'(ω) of the ideal complex transfer function may be stored in advance as reflection coefficient 51 in memory 50 and may be read out and acquired.

Next, reflection-coefficient calculator 302 calculates reflection coefficient Γ and frequency response ΓF of the reflection coefficient by Expressions 3 and 4 below.

[Math. 4]

$$\Gamma = H \oslash H' \qquad \text{(Expression 3)}$$

[Math. 5]

$$\Gamma F = HF \oslash HF' \qquad \text{(Expression 4)}$$

Here, $$\oslash \qquad \text{[Math. 6]}$$

denotes the operator called Hadamard division that means division for each element of the matrix.

Various Normalizers 303

Various normalizers 303 calculate a normalized reflection coefficient by normalizing the reflection coefficient by a predetermined method. Various normalizers 303 correspond to a normalized-reflection-coefficient calculator.

Specifically, various normalizers 303 normalize the reflection coefficient by a method described below. In normalization using antenna numbers, for example, Expression 5 below may be used in calculation to normalize the reflection coefficient, using antenna 1 as a reference.

[Math. 7]

$$hf'_{mn}(k) = hf_{mn}(k)/hf_{11}(k) \qquad \text{(Expression 5)}$$

Here, m denotes the receiving antenna number, n denotes the transmitting antenna number, and k denotes the frequency number in Fast Fourier transformation (FFT). In the normalization using the antenna numbers, $hf_{mn}$ may be normalized using a different antenna other than antenna 1, or may be averaged using Expression 6.

[Math. 8]

$$hf'_{mn}(k) = hf_{mn}(k) / \frac{1}{MN} \sum_{m=1}^{M} \sum_{n=1}^{N} hf_{mn}(k) \qquad \text{(Expression 6)}$$

In addition to the normalization or averaging using the antenna numbers, various normalizers 303 may further calculate an average value of the phase by Expression 7.

[Math. 9]

$$hf'_{mn}(k) = \frac{hf_{mn}(k)}{e^{j\alpha}} \qquad \text{(Expression 7)}$$

However,

[Math. 10]

$$\alpha = \frac{1}{MN} \sum_{m=1}^{M} \sum_{n=1}^{N} \angle hf_{mn}(k) \qquad \text{(Expression 8)}$$

holds true.

In addition to the normalization or averaging using the antenna numbers or the averaging of the phase, various normalizers 303 may further perform averaging in the frequency direction by Expression 9.

[Math. 11]

$$hf''_{mn} = \frac{1}{K} \sum_{k=1}^{K} hf'_{mn}(k) \qquad \text{(Expression 9)}$$

Here, K denotes the maximum value for the frequency number in FFT.

Note that various normalizers 303 may normalize the phase in the frequency direction.

Various normalizers 303 may further normalize the phase for each measuring position.

In this way, various normalizers 303 may, for example, arrange living bodies 60 in order at predetermined positions such as nine positions indicated by the crosses in FIG. 4, receive the first received signals from receiver unit 30 in the state in which living bodies 60 are arranged at the positions of arrangement, and calculate reflection coefficient Γ or frequency response ΓF of the reflection coefficient a predetermined number of times.

Here, various normalizers 303 may store normalized reflection coefficient Γ or frequency response ΓF of the reflection coefficient in memory 50. Then, various normalizers 303 may read out and reuse normalized reflection coefficient Γ or frequency response ΓF of the reflection coefficient with increased number of different sensors 110. This is because, although the antennas are shareable due to slight differences in radiation pattern and radiation phase characteristics among mass products, the interpolation of the reflection coefficient requires re-calculation for every change in the position of installation.

Reflection-Coefficient Interpolator 304

Reflection-coefficient interpolator 304 calculates an interpolated reflection coefficient by interpolation calculation of the reflection coefficient using the normalized reflection coefficient for each coordinates used in position estimation of an object to be detected by a predetermined method. Reflection-coefficient interpolator 304 corresponds to an interpolated-reflection-coefficient calculator.

Specifically, reflection-coefficient interpolator 304 determines coordinates at each positions prescribed in advance as (Xi, Yi), where i=1, 2, . . . , I, and defines Γi as a reflection coefficient vector observed at the coordinates. The reflection coefficients for positions other than the I positons need to be obtained by interpolation. Since the coordinates (Xi, Yi) used to estimate the positions of living bodies 60 are distributed in two dimensions, two-dimensional interpolation is necessary. The method of interpolation may, for example, be linear interpolation or spline interpolation. By the aforementioned interpolation based on reflection coefficients Γi to ΓI, reflection-coefficient interpolator 304 calculates reflection coefficient Γ(X, Y) for coordinates (X, Y) used to obtain the steering vector.

Steering-Vector Corrector 305

When the steering vector at position (X, Y) obtained by an MIMO radar is defined as a(X, Y), steering-vector corrector 305 is capable of calculating corrected steering vector a'(X, Y) as given by Expression 10.

[Math. 12]

$$a'(X,Y)=a(X,Y)\odot\Gamma(X,Y) \quad \text{(Expression 10)}$$

Here, $$\odot \quad \text{[Math. 13]}$$

denotes the Hadamard product that means the product for each element of the vector.

Position Estimator 306

Position estimator 306 corrects the position estimation by the predetermined method, using the steering vector and the interpolated reflection coefficient that are determined based on the position of each of the transmitting antenna elements and the receiving antenna elements. Position estimator 306 also calculates a corrected steering vector by correcting the steering vector using the steering vector and the interpolated reflection coefficient. The functional unit for calculating the corrected steering vector is also referred to as a corrected-steering-vector calculator. When the corrected steering vector is calculated by the corrected-steering-vector calculator, position estimator 306 corrects the position estimation, using the corrected steering vector obtained by the corrected-steering-vector calculator.

Specifically, position estimator 306 is capable of estimating the positions of living bodies by, for example, an existing MUSIC algorithm using the steering vector obtained by the correction performed by steering-vector corrector 305. Position estimator 306 also corrects the position estimation by a predetermined method using the steering vector and the interpolated reflection coefficient that are determined based on the position of each of the transmitting antenna elements and the receiving antenna elements.

In some cases, all the reflection coefficient vectors obtained for the I positions may be multiplied by a random phase. This is caused by a temporal relationship between the timing of observation and the cycle of respiration or heartbeat of the living bodies. In this case, the accuracy of the aforementioned interpolation can be improved by multiplying all the reflection coefficient vectors by an appropriate phase.

When $e^{j\theta_i}$ is defined as a phase correction coefficient of the reflection coefficient for the i-th position, position estimator 306 is capable calculating reflection coefficient vector Γi' whose phase is corrected as given by Expression 11.

[Math. 14]

$$\Gamma_1'=\Gamma_1\cdot e^{j\theta_1};\ \Gamma_1'=\Gamma_1\cdot e^{j\theta_1} \quad \text{(Expression 11)}$$

When the j-th element of reflection coefficient vector Γi' is defined as $\gamma'_{ij}$, the dispersion of the phases between predetermined positions can be calculated from Expression 12.

[Math. 15]

$$\sigma^2 = \frac{1}{IJ}\sum_{j=1}^{J}\sum_{i=1}^{I}\left(L\gamma'_{ij} - \overline{L\gamma'_{ij}}\right)^2 \quad \text{(Expression 12)}$$

Here, j denotes the number of elements in each Γi'. Position estimator 306 calculates phase correction coefficients θ1 to θ1 using this dispersion as a minimum. The method of calculation may, for example, be a general method such as random search or a steepest ascent method.

In this way, sensor 110 illustrated in FIG. 1 is capable of estimating the positions of living bodies 60 by causing receiver circuit 40 to process the signals received by receiver unit 30.

Operations of Sensor 110

Figure 6:
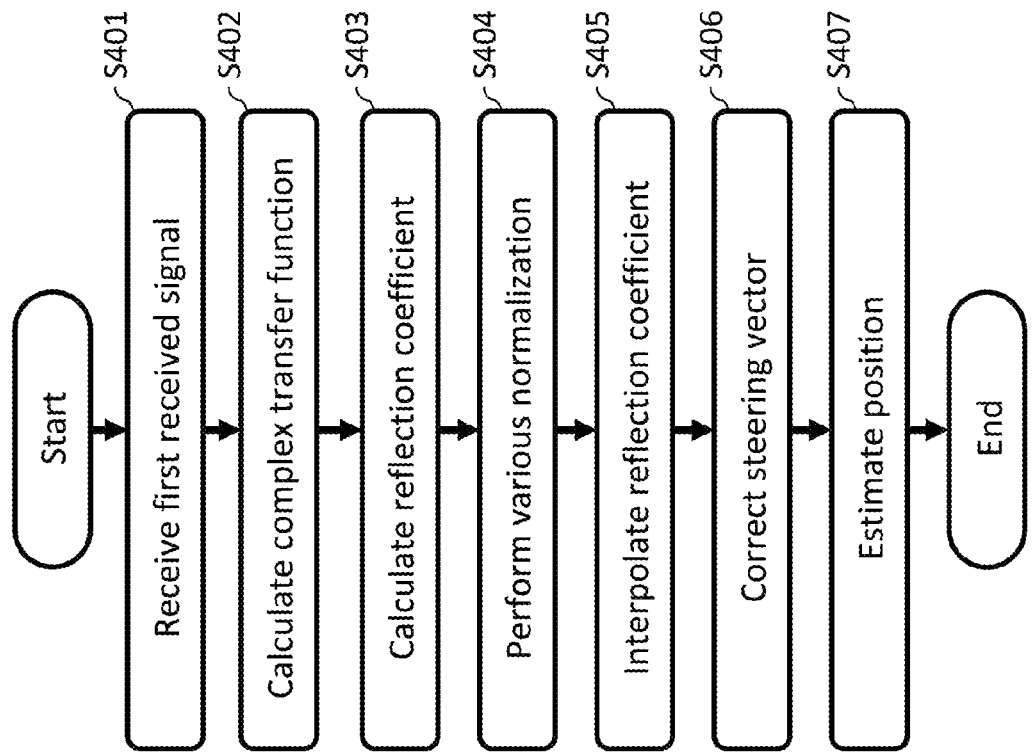
FIG. 6 is a flowchart of estimation processing performed by an estimation apparatus according to the embodiment.

A description is given of the operations of sensor 110 configured as described above. FIG. 6 is a flowchart showing one example of the operations of sensor 110 according to the present embodiment.

In the present embodiment, by way of example, the accuracy of estimating the positions of living bodies 60 is improved by arranging transmitter 11 and receiver 10 respectively at the lower left and the lower right of predetermined region A1 illustrated in FIG. 4, and receiving the first received signals by the receiver 30 in a state in which the living bodies are arranged at the positions indicated by the crosses, calculating the reflection coefficients by receiver circuit 40, calculating the interpolated values for the reflection coefficients in a fine grid formed by the points of intersection of additional lines illustrated in FIG. 5, and correcting the steering vector.

In this example, intervals between the crosses in FIGS. 4 and 5 are defined as 1 m and the grid interval in FIG. 5 is defined as 10 cm, but these intervals may be changed depending on the purpose of application, e.g., the intervals between the crosses may be defined as 1.5 m and the grid interval may be defined as 15 cm.

In the present embodiment, by way of example, living bodies 60 are arranged in order at nine positions indicated by the crosses in FIG. 4, and the reflection coefficients corresponding to each position are acquired. Sensor 110 transmits $M_T$ transmission signals to predetermined region A1 and receives, as $M_R$ first received signals, the reflection signals reflected from living bodies 60 arranged at the positions indicated by the crosses (S401).

More specifically, sensor 110 uses the $M_T$ transmitting antenna elements to transmit the first transmission signals to predetermined region A1 including living bodies 60. Then, sensor 110 uses the $M_R$ receiving antenna elements to receive the first received signals for a predetermined period, the first received signals including the reflection signals obtained by reflection of the first transmission signals from living bodies 60.

Here, receiver 10 and transmitter 11 are used as illustrated in FIG. 4. Receiver 10 and transmitter 11 as used herein may form a two-device configuration as illustrated in FIG. 4, or may form a four-device configuration. Any number of devices may be used as long as the number of devices is two or more. Moreover, four-element square patch antennas are used as the receiving antenna elements and the transmitting antenna elements. More specifically, four of the transmitting antenna elements of transmitter 11 and four of the receiving antenna elements of receiver 10 each serve as a square patch antenna and are placed at a height of 0.9 m from the floor surface. Here, transmitter 11 and receiver 10 may be shared, or may not be shared.

Next, sensor 110 calculates a complex transfer function from the first received signals acquired in step S401. More specifically, first, sensor 110 calculates a complex transfer function as complex transfer function H(t) from the $M_T \times M_R$ first received signals obtained as a result of the $M_R$ receiving antenna elements receiving the reflection signals obtained by reflection of the first transmission signals from each living body 60, the first transmission signals being transmitted from the $M_T$ transmitting antenna elements to living body 60 (S402).

Next, sensor 110 calculates ideal complex transfer function H'(t) and frequency response HF'(ω) of the ideal complex transfer function by simulation for the position at which living body 60 is arranged. At this time, ideal complex transfer function H'(t) and frequency response HF'(ω) of the ideal complex transfer function may be calculated by performing a radio simulation in which an ideal reflection plate such as an iron plate is arranged at the position at which living body 60 is arranged. Moreover, ideal complex transfer function H'(t) corresponding to the position of arrangement and frequency response HF'(ω) of the ideal complex transfer function may be stored in advance as reflection coefficient 51 in memory 50 and read out. Next, sensor 110 calculates reflection coefficient Γ from complex transfer function H(t) and ideal complex transfer function H'(t) and calculates frequency response ΓF for the reflection coefficient from the frequency response of the complex transfer function and frequency response HF'(ω) of the ideal complex transfer function (S403).

Next, sensor 110 normalizes or averages reflection coefficient Γ and frequency response ΓF of the reflection coefficient using the antenna numbers, or further calculates an average value of the phase (S404).

In this way, sensor 110 receives the first received signals by receiver 30 in a state in which living bodies 60 are arranged at predetermined positions such as nine positions indicated by the crosses in FIG. 4, and calculates normalized reflection coefficient Γ or frequency response ΓF of the normalized reflection coefficient.

Next, sensor 110 defines the coordinates at each position prescribed in advance as (Xi, Yi), where i=1, 2, . . . , I. The following description of the present embodiment assumes that I=9, by way of example.

Sensor 110 defines the reflection coefficient vector observed at coordinates (Xi, Yi) as Γi and obtains reflection coefficients at positions other than the nine positions by interpolation. Since the coordinates (Xi, Yi) used to estimate the positions of living bodies 60 are distributed in two dimensions, two-dimensional interpolation is performed. The method of interpolation may, for example, be linear interpolation or spline interpolation.

By the aforementioned interpolation based on reflection coefficients Γ1 to Γ9, sensor 110 calculates reflection coefficient Γ(X, Y) for coordinates (X, Y) used to obtain the steering vector. In the example illustrated in FIG. 5, the coordinates used to obtain the steering vector are set at intervals of 0.1 m, and positioning estimation is performed across entire 4 m by 4 m predetermined region A1. Thus, the calculation of interpolated values for reflection coefficients Γ(X, Y) is performed at intervals of 0.1 m (S405).

Next, sensor 110 defines the steering vector at position (X, Y) obtained by an MIMO radar as a(X, Y) and calculates corrected steering vector a'(X, Y) (S406).

Then, sensor 110 uses the steering vector obtained as described above to estimate the positions of the living bodies by, for example, an existing MUSIC algorithm (S407).

Advantageous Effects

In the environment used in the test illustrated in FIG. 4, sensor 110 arranges living bodies 60 at intervals of 1 m in predetermined region A1, transmits transmission waves from transmitter 11, and receives the first received signals by receiver 10.

Then, sensor 110 calculates ideal complex transfer function H'(t) and frequency response HF'(ω) of the ideal complex transfer function by simulation for the position at which each living body 60 is arranged.

Next, sensor 110 calculates reflection coefficient Γ from complex transfer function H(t) and ideal complex transfer function H'(t) and also calculates frequency response ΓF of the reflection coefficient from frequency response HF(ω) of the complex transfer function and frequency response HF' (ω) of the ideal complex transfer function.

Next, sensor 110 normalizes or averages reflection coefficient Γ and frequency response ΓF of the reflection coefficient, using the antenna numbers, and further calculates an average value of the phase.

Next, sensor 110 defines the reflection coefficient vector observed at coordinates (Xi, Yi) as Γi, where (Xi, Yi) indicates the coordinates at each position prescribed in advance, and obtains reflection coefficients at positions other than the nine positions by interpolation. The sensor further performs two-dimensional interpolation because coordinates (Xi, Yi) used to estimate the positions of living bodies 60 are distributed in two dimensions. By the aforementioned interpolation based on reflection coefficients Γ1 to Γ9, sensor 110 calculates reflection coefficient Γ(X, Y) for coordinates (X, Y) used to obtain the steering vector. Then, sensor 110 defines the steering vector corresponding to position (X, Y) obtained by an MIMO radar as a(X, Y) and calculates corrected steering vector a'(X, Y). Sensor 110 is capable of using the steering vector obtained as described above to estimate the positions of the living bodies by, for example, an existing MUSIC algorithm.

Sensor 110 provided with directional antennas through the above-described calibration is capable of correcting the steering vector and improving the accuracy of estimating the positions of the living bodies by measuring the reflection coefficients at several measuring points having different angles or positions relative to transmitter 11 or receiver 10 and normalizing and interpolating reflection coefficients at coordinates other than the measuring points by the measured reflection coefficients.

The following description is given of experimental results obtained by simulation using the sensor according to the present disclosure.

Experimental Conditions

In this experiment, the intervals of antenna array elements were set to 0.5 wavelengths, one side of a baseplate was set to 121.4 mm, the short sides of a patch were set to 6.47 mm, and the long sides of the patch were set to 19.6 mm. This experiment was conducted in a 4 meter by 4 meter indoor environment. In the environment as illustrated in FIG. 4, a 4 by 4 MIMO configuration was provided in which two sets of four-element inverted-F antenna array were used as transmitter 11 and receiver 10. The coordinates of transmitter 11 and receiver 10 were set to (4, 0)m and (0, 0)m, respectively, and the signal-to-noise ratio (SNR) was set to 10 dB.

Experimental Results

Figure 8:
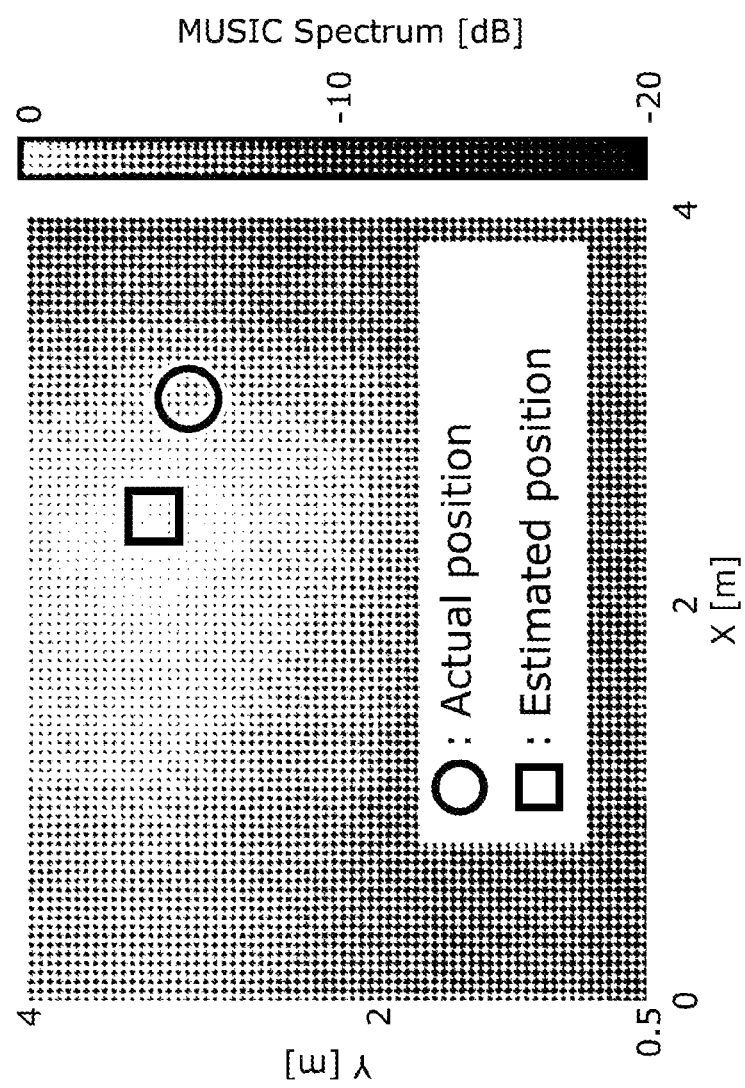
FIG. 8 shows an example of calculation results obtained by position estimation performed by a conventional method as a prior art example of the embodiment.
Figure 9:
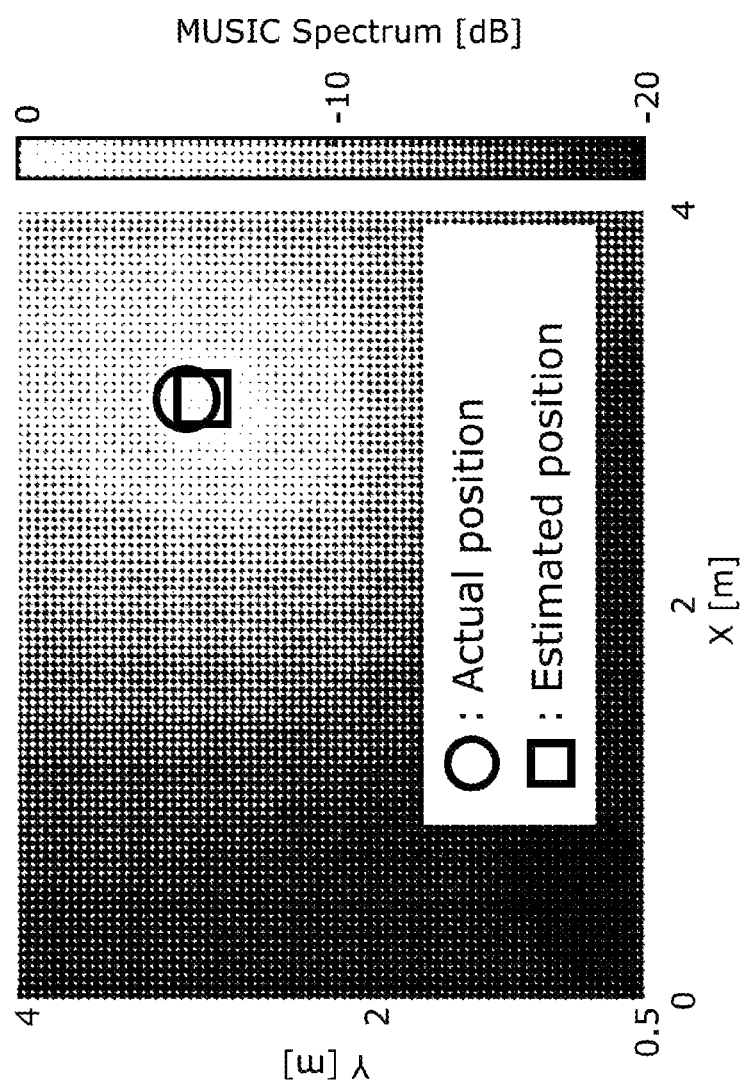
FIG. 9 shows an example of calculation results obtained by position estimation according to the embodiment.

One example of the result of positon estimation is shown in which the coordinates of a subject were set to (3, 3)m. FIG. 8 shows an example of the result of calculation in which position estimation was performed by a conventional method as a prior-art example. FIG. 9 shows an example of the result of calculation in which position estimation was performed in accordance with the present embodiment. Here, the result is shown together that is obtained by a conventional method using the steering vector in which a feeding point is used as a reference.

Figure 10:
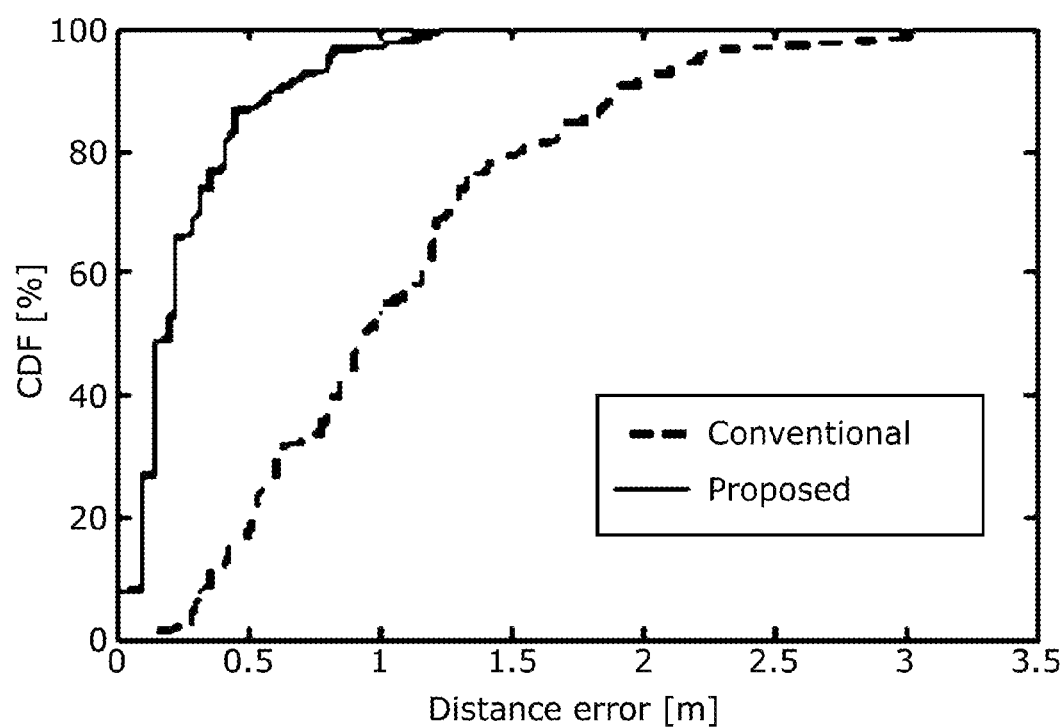
FIG. 10 is a diagram showing one example of a cumulative probability distribution (cumulative distribution function: CDF) of errors in position estimation performed by a conventional method and by the method according to the embodiment of the present disclosure.

In the conventional method, an error in position estimation was approximately 0.6 m, but this was improved to 0.1 m by the proposed method. FIG. 10 shows one example of cumulative probability distributions (cumulative distribution functions: CDF) of errors in position estimation obtained by the conventional method and by the method according to the present embodiment. When focusing on a CDF value of 50%, the error in the conventional method was 0.94 m, but the error in the proposed method was 0.2 m. This indicates that the proposed method can considerably improve the positioning error.

Variations

Although the embodiment has described one example of calculating the corrected steering vector by using the steering vector and the interpolated reflection coefficient, the present disclosure is not limited to this example. For example, the steering vector and the interpolated reflection coefficient may be calculated, a calibrated value may be calculated using the steering vector and the interpolated reflection coefficient, and estimated position information may be corrected by an additional first method.

The embodiment has described one example of performing all of the normalization using the antenna numbers performed by various normalizers 303 and given by Expressions 5 and 6, the normalization of the phase for each frequency given by Expressions 7 and 8, and the normalization using a complex number in the frequency direction given by Expression 9. The present disclosure is, however, not limited to this example. For example, it is also possible to perform only some of the normalization using the antenna numbers, the normalization of the phase for each frequency, and the normalization of a complex number in the frequency direction.

Note that a system that includes the above-described sensor achieves effects similar to those of the above-described sensor. The system as used herein includes the above-described sensor and a server. The above-described sensor transmits the result of position estimation to the server. The server receives the result of position estimation transmitted from the sensor.

As described above, the sensor according to the present embodiment is capable of estimating the positions of living bodies by accurately correcting position estimation even in the case where the sensor includes directional antennas. This technique allows the application of the living-body position estimation technique even to communication equipment that uses antennas with a wider radiation range, i.e., a wider communication range (e.g., inverted-F antennas or sheet-metal antennas) than antennas that have limited radiation directions but have simple shapes or characteristics (e.g., dipole antennas, monopole antennas, or patch antennas). This increases the accuracy of position estimation using the sensor provided with antennas with a wide radiation range. Accordingly, in the apparatus for estimating the position of a living body by using radio signals, the sensor is capable of calibrating devices by a simple method in a short time and with high accuracy.

Moreover, even if provided with directional antennas, the sensor contributes to estimating the positions of living bodies by accurately correcting the position estimation. This technique allows the application of the living-body position estimation technique even to communication equipment that uses antennas with a wider radiation range, i.e., a wider communication range (e.g., inverted-F antennas or sheet-metal antennas) than antennas that have limited radiation directions but have simple shapes or characteristics (e.g., dipole antennas, monopole antennas, or patch antennas). This increases the accuracy of position estimation using the sensor provided with antennas with a wide radiation range. Accordingly, in the apparatus for estimating the position of a living body by using radio signals, the sensor is capable of calibrating devices by a simple method in a short time and with high accuracy.

Moreover, even if provided with directional antennas, the sensor is capable of estimating the position of a living body by accurately correcting the position estimation. This technique allows the application of the living-body position estimation technique even to communication equipment that uses antennas with a wider radiation range, i.e., a wider communication range (e.g., inverted-F antennas or sheet-metal antennas) than antennas that have limited radiation directions but have simple shapes or characteristics (e.g., dipole antennas, monopole antennas, or patch antennas). This increases the accuracy of position estimation using the sensor provided with antennas with a wide radiation range. Accordingly, in the apparatus for estimating the position of a living body by using radio signals, the sensor is capable of calibrating devices by a simple method in a short time and with high accuracy.

Moreover, the sensor corrects the position estimation, using the corrected steering vector obtained by correction using the steering vector and the interpolated reflection coefficient. Therefore, it is possible to more easily configure devices in a short time and with high accuracy.

Moreover, the sensor performs position estimation using the received signals whose phases are normalized in the frequency direction. Accordingly, in the apparatus for estimating the position of a living body by using radio signals, the sensor is capable of calibrating the devices by a simple method in a short time and with high accuracy.

Moreover, the sensor performs position estimation using the received signals whose phases are normalized for each measuring position. Accordingly, in the apparatus for estimating the position of a living body by using radio signals, the sensor is capable of calibrating the devices by a simple method in a short time and with high accuracy.

Note that in the above-described embodiment, each constituent element may be configured by dedicated hardware, or may be implemented by executing a software program suitable for the constituent element. Each constituent element may be implemented by a program executor such as a CPU or a processor reading out and executing a software program recorded on a hard disk or a recording medium such as a semiconductor memory. Here, software that implements the sensor according to the above-described embodiment may be the following program.

Specifically, this program is a program for causing a computer to execute a method of controlling a sensor that includes a transmitting antenna unit and a receiving antenna unit. The transmitting antenna unit includes N transmitting antenna elements (N is a natural number greater than or equal to 2) that transmit signals to a predetermined space, and the receiving antenna unit includes M receiving antenna elements (M is a natural number greater than or equal to 2) that receive signals transmitted from the transmitting antenna unit for a predetermined period. The control method includes calculating a complex transfer function from the above received signals, calculating, for each of L positions (L is two or more natural numbers), a complex transfer function when an object to be detected is arranged at the position among the L positions and calculating an ideal complex transfer function for each of the L positions, the ideal complex transfer function being a theoretical value for the position at which the object to be detected is arranged, calculating a reflection coefficient using the complex transfer function and the ideal complex transfer function, calculating a normalized reflection coefficient by normalizing the reflection coefficient by a predetermined method, calculating an interpolated reflection coefficient by interpolation calculation of the reflection coefficient using the normalized reflection coefficient for each coordinates used in position estimation of the object to be detected by a predetermined method, and correcting the position estimation by a predetermined method using the steering vector and the interpolated reflection coefficient that are determined based on the position of each of the transmitting antenna elements and the receiving antenna elements.

The sensor and so on according to one or a plurality of aspects of the present disclosure have been described thus far based on the embodiment, but the present disclosure is not intended to be limited to this embodiment. One or a plurality of aspects of the present disclosure may also include modes such as those obtained by making various modifications conceivable by those skilled in the art to the embodiment and those constituted by any combination of constituent elements in different embodiments without departing from the gist of the present disclosure.

Industrial Applicability

The present disclosure is applicable to an estimation device and an estimation method for estimating the position of a living body by using radio signals and, in particular, applicable to home electric appliances for performing control depending on a living body, a sensor mounted on devices such as a monitoring device for sensing the entry of a living body, an estimation device, and an estimation method.

REFERENCE SIGNS LIST 10 receiver
20 receiving antenna unit
30 receiver unit
40 receiver circuit
50 memory
51 reflection coefficient
60 living body
11 transmitter
21 transmitting antenna unit
31 transmitter unit
41 transmitter circuit
110, 111 sensor
121, 122, 123 receiving antenna element
221, 222, 223 antenna characteristic
301 complex-transfer-function calculator
302 reflection-coefficient calculator
303 various normalizers
304 reflection-coefficient interpolator
305 steering-vector corrector
306 position estimator
A1 predetermined region

The invention claimed is:

1. A sensor comprising:
a transmitting antenna unit that includes N transmitting antenna elements that transmit signals to a predetermined space, where N is a natural number greater than or equal to 2;
a receiving antenna unit that receives the signals transmitted from the transmitting antenna unit for a predetermined period and that includes M receiving antenna elements that receive the signals received, where M is a natural number greater than or equal to 2;
a complex-transfer-function calculator that calculates a complex transfer function from the signals received;
a reflection-coefficient calculator that calculates a complex transfer function when an object to be detected is arranged at one of L positions, where L is a natural number greater than or equal to 2, for each of the L positions, calculates an ideal complex transfer function for each of the L positions, the ideal complex transfer function being a theoretical value for the position at which the object to be detected is arranged, and calculates a reflection coefficient using the complex transfer functions and the ideal complex transfer functions;
a normalized-reflection-coefficient calculator that calculates a normalized reflection coefficient by normalizing the reflection coefficient by a predetermined method;
an interpolated-reflection-coefficient calculator that calculates an interpolated reflection coefficient by interpolation calculation of the reflection coefficient using the normalized reflection coefficient for each coordinate used in position estimation of the object to be detected by a predetermined method; and
a position estimator that corrects the position estimation by a predetermined method, using a steering vector and the interpolated reflection coefficient that are determined based on a position of each of the transmitting antenna elements and the receiving antenna elements.

2. The sensor according to claim 1,
wherein the position estimator includes a corrected-steering-vector calculator that calculates a corrected steering vector by correcting the steering vector using the steering vector and the interpolated reflection coefficient, and
the position estimator corrects the position estimation, using the corrected steering vector corrected by the corrected-steering-vector calculator.

3. The sensor according to claim 1,
wherein the normalized-reflection-coefficient calculator normalizes a phase in a frequency direction, using a signal received from a predetermined antenna element among the M receiving antenna elements.

4. The sensor according to claim 3,
wherein the normalized-reflection-coefficient calculator further normalizes the phase for each measuring position.

5. A sensor comprising:
a transmitting antenna unit that includes N transmitting antenna elements that transmit signals to a predetermined space, where N is a natural number greater than or equal to 2;
a receiving antenna unit that receives the signals transmitted from the transmitting antenna unit for a predetermined period and that includes M receiving antenna elements that receive the signals received, where M is a natural number greater than or equal to 2;
a processor that:
  calculates a complex transfer function from the signals received;
calculates a complex transfer function when an object to be detected is arranged at one of L positions, where L is a natural number greater than or equal to 2, for each of the L positions, calculates an ideal complex transfer function for each of the L positions, the ideal complex transfer function being a theoretical value for the position at which the object to be detected is arranged, and calculates a reflection coefficient using the complex transfer functions and the ideal complex transfer functions;
  calculates a normalized reflection coefficient by normalizing the reflection coefficient by a predetermined method;
a memory that stores the normalized reflection coefficient;
the processor that reads out the normalized reflection coefficient from the memory and calculates an interpolated reflection coefficient by interpolation calculation of the reflection coefficient using the normalized reflection coefficient for each coordinate used in position estimation of the object to be detected by a predetermined method; and
the processor that corrects the position estimation by a predetermined method, using a steering vector and the interpolated reflection coefficient that are determined based on a position of each of the transmitting antenna elements and the receiving antenna elements.

6. A control method for controlling a sensor that includes a transmitting antenna unit and a receiving antenna unit,
the transmitting antenna unit including N transmitting antenna elements that transmit a signals to a predetermined space, where N is a natural number greater than or equal to 2, and
the receiving antenna unit receiving the signals transmitted from the transmitting antenna unit for a predetermined period and including M receiving antenna elements that receive the signals received, where M is a natural number greater than or equal to 2,
the control method comprising:
  calculating a complex transfer function from the signals received;
  detecting an object arranged at one position of L positions, where L is a natural number greater than or equal to 2;
  in response to the detecting, calculating a complex transfer function for each of the L positions, calculating an ideal complex transfer function for each of the L positions, the ideal complex transfer function being a theoretical value for the position at which the object to be detected is arranged, and calculating a reflection coefficient using the complex transfer functions and the ideal complex transfer functions;
  calculating a normalized reflection coefficient by normalizing the reflection coefficient by a predetermined method;
  calculating an interpolated reflection coefficient by interpolation calculation of the reflection coefficient using the normalized reflection coefficient for each coordinate used in position estimation of the object to be detected by a predetermined method; and
  correcting the position estimation by a predetermined method, using a steering vector and the interpolated reflection coefficient that are determined based on a position of each of the transmitting antenna elements and the receiving antenna elements.

* * * * *